Patented June 20, 1950

2,512,249

UNITED STATES PATENT OFFICE 2,512,249

PREPARATION OF ALKALI METAL DERIVATIVES OF 2-AMINOPYRIDINE

Martin E. Hultquist, Bound Brook, and John C. Paterson, Westfield, N. J., assignors to American Cyanamid Company, New York, N. Y., a corporation of Maine No Drawing. Application April 17, 1948, Serial No. 21,746

6 Claims. (Cl. 260—296)

1

This invention relates to an improved method of preparation of alkali metal derivatives of 2-aminopyridine such as the sodium salt.

In the past the alkali metal salts of 2-aminopyridine such as the sodium salt have been prepared for use in condensing with such compounds as dialkylaminoalkylhalides and other alkyl halides in order to introduce the particular alkyl group into the 2-amino group of pyridine. These compounds have been of considerable practical importance as intermediates for producing pharmaceuticals especially those having an antihistamine effect.

The standard procedure in the past was to introduce the alkali metal into the amino group of the 2-aminopyridine by reaction of the compound with sodium hydride or sodium amide. These procedures were open to a number of disadvantages. For example, sodium hydride tends to be rather explosive and the explosion and fire hazard made the process unattractive. Sodium amide, was also not satisfactory as it has to be kept under organic solvents to prevent explosion hazards and its stability is so low that it cannot be stored. The problem of a satisfactory process which can be safely and economically used had not been solved up to the present time.

It is well known that when the sodium salt of 2-aminopyridine is reacted with methyl alcohol, sodium is split off forming sodium methylate and 2-aminopyridine is regenerated. This is an example of a rather typical kind of reaction involving sodium salts of amines. The present invention is based on the fact which has been discovered that under peculiar conditions and at high temperatures it is possible to reverse this reaction and by reacting 2-aminopyridine with an alkali metal alcoholate, such as sodium methylate, sodium ethylate, potassium methylate, sodium butylate, to produce the corresponding alkali metal salt of the 2-aminopyridine in a smooth reaction which does not present any explosion hazard and which operates with adequate yields under satisfactory practical operating conditions.

There is a limit to the number of carbon atoms in the alcoholate used because the boiling point of the alcohol given off increases with increased molecular weight until a point is reached where the required temperature is so high that serious losses of aminopyridine result. For practical purposes alcoholates with seven carbon atoms represent the extreme limit and alcoholates with 1–5 carbon atoms are distinctly more advantageous and are therefore preferred.

While the requirement for a high temperature

2 is essential in the operation of the present invention the exact elevated temperature is not extremely critical. In general, temperatures above 100° C. must be employed in order to drive off the methyl alcohol formed in the reaction and to cause it to proceed in the desired direction. Higher temperatures up to 200° C. and higher may be employed but in general the preferred range is from about 110° C. to 210° C.

It is possible to carry out the reaction as a batch process in which the two reagents are heated to the desired temperature until reaction has ceased. However, for safe operation it is desirable to remove continuously the alcohol set free in the reaction. The presence of an organic solvent, which is preferred, aids in the removal of the alcohol as it lowers the partial pressure of the alcohol vapors and in some cases may form with the alcohol an azeotrope. For maximum speed of alcohol removal some of the solvent has to be volatilized and it is therefore desirable to operate under a partial reflux, the condenser temperature being maintained so that the major portion of the vaporized solvent is condensed and flows back into the reaction mixture while the alcohol vapors pass out of the head of the condenser. In general, temperatures as high as 110° C. should prevail at the head of the reflux condenser. For best results temperatures between 130°–140° C. are preferred.

It is not known just why the reaction proceeded in a reverse direction from that ordinarily noted when the particular elevated temperatures are used, and it is therefore not desired to restrict the invention to any particular theory of action.

It is an advantage of the present invention that a reaction mixture is obtained which on completion of the reaction and removal by distillation of the alcohol formed is suitable for reaction with the alkyl halide desired. The fact that it is not necessary to isolate the alkali metal salt of the 2-aminopyridine in pure form is an added advantage of the invention and represents a substantial operating economy. The invention will therefore be described in greater detail in the following specific examples in its preferred form in which the production of the alkali metal salt of the 2-aminopyridine is followed without isolation by reaction with a typical reagent containing a halogen group namely, a dialkylaminoalkyl halide. This is the most important use for the invention but it should be understood that the process of the invention is not limited to the further alkylation of the unisolated material. In the examples the parts are by weight.

Example 1

94 parts of anhydrous 2-aminopyridine dissolved in 850 parts of dry xylene are introduced into a reaction vessel provided with a suitable reflux condenser. 108 parts of dry sodium methylate are then added and the reaction mixture heated up to a slow distillation with a head temperature of about 138° C. The reaction is maintained under gentle reflux with a head temperature of 138° C. for a long period, for example, more than 20 hours. During this time distillate is removed from the head of the reflux condenser at intervals whenever any temperature drop at the head is noted. When the reaction has proceeded substantially to completion the total distillate removed is of the order of the magnitude of about 275 parts.

After all of the distillate has been removed a solution of 107.5 parts of dry dimethylaminoethylchloride dissolved in 200 parts of dry xylene is added while distilling slowly. The head temperature drops to about 131° C. and then as the distillation proceeds rises again to about 138° C. After a total of about 360 parts has been distilled off at the final head temperature, refluxing is continued for about an hour and the reaction mixture then cooled to 40° C., filtered and washed with xylene until the wash is clear. The xylene is then removed by vacuum distillation leaving a still heel of crude 2-dimethylaminoethylamino pyridine which is treated with alcoholic hydrochloric acid, cooled to 0° C., the dihydrochloride salt filtered and washed with cold alcohol.

When the above procedure is carried out with an equivalent amount of sodium ethylate replacing the sodium methylate, the reaction proceeds in precisely the same manner, ethyl alcohol being removed from the head of the reflux condenser instead of methyl alcohol.

Example 2

94 parts of anhydrous 2-aminopyridine dissolved in 240 parts of dry xylene are introduced into a reaction vessel provided with a reflux condenser. 108 parts of dry sodium methylate are added and the reaction mixture heated up to a temperature such that the head of the condenser is at 138° C. Methyl alcohol slowly distills off and then 107.5 parts of dimethylaminoethyl chloride dissolved in 300 parts of dry xylene are gradually added. The reaction is maintained at a slow distillation until the head temperature stabilizes at 138° C. After the reaction is complete the product is worked up as described in Example 1 and after conversion to the free base has a refractive index of 1.542.

Example 3

94 parts of anhydrous 2-aminopyridine dissolved in 250 parts of diphenyl at 80° C. are introduced into a reaction vessel and 108 parts of dry alcohol-free sodium methylate added. The reaction mixture is heated up to about 200° C., a small amount of material distilling off at 65-75° C.

After the reaction is complete the mixture is cooled to 150° C. and a solution of 107.5 parts of dry dimethylaminoethyl chloride in 100 parts of diphenyl added at a temperature of about 150° C. the addition being gradual. A distillate comes over at 125-130° C. and temperature of the reaction mixture is finally maintained at 160° C., the reaction being continued at this temperature for about an hour after all of the distillate has come off. The mixture is then cooled, filtered, and worked up as described in Example 2, producing a product having a refractive index of 1.541.

Example 4

94 parts of anhydrous 2-aminopyridine dissolved in 900 parts of dry toluene are added to a reaction vessel provided with a reflux condenser. 108 parts of dry sodium methylate are added at 50° C. and the reaction heated up until the head of the still shows a temperature of 111° C. A portion distills over slowly and the reaction is maintained for over 20 hours under reflux.

After the reaction is complete a solution 107.5 parts of dry dimethylaminoethyl chloride in 200 parts of dry toluene is gradually added. The reaction mixture is kept distilling at a slow rate during and after the addition until the head temperature stabilizes at 111° C. After all the material that will distill off at this temperature has come off, the heating is continued under reflux for about an hour which results in completion of the reaction. The mixture is then cooled, filtered and worked up as described in Example 2, producing a product having a refractive index of 1.542.

In the examples sodium methylate is used as the reagent. This is preferred because the sodium methylate is the cheapest alcoholate available. However, the present invention is not in any sense limited to the use of sodium alcoholates; the corresponding potassium alcoholates operating satisfactorily although being less desirable because of their additional cost.

We claim:

1. A method according to claim 6 in which the alcoholate does not have more than five carbon atoms.

2. A method according to claim 1 in which the alkali metal alcoholate is sodium methylate.

3. A method according to claim 2 in which the temperature of reaction is between 110-210° C.

4. A method according to claim 1 in which the temperature of reaction is between 110-210° C.

5. A method according to claim 6 in which the temperature of reaction is between 110-210° C.

6. A method of producing a derivative of 2-aminopyridine capable of reacting with a dialkylaminoalkyl chloride in an inert organic solvent therefor to yield a 2-(dialkylaminoalkylamino) pyridine, which comprises forming an anhydrous mixture of 2-aminopyridine, an alkali metal alcoholate, and an inert organic solvent therefor, heating said mixture, reacting said alcoholate with said pyridine, and distilling off the alcohol which forms.

MARTIN E. HULTQUIST.
JOHN C. PATERSON.

REFERENCES CITED

The following references are of record in the file of this patent:

UNITED STATES PATENTS

| Number | Name | Date |
|---|---|---|
| 2,230,774 | Bockmuhl et al. | Feb. 4, 1941 |
| 2,406,594 | Djerassi et al. | Aug. 27, 1946 |